(12) United States Patent
Al-Qahtani et al.

(10) Patent No.: US 12,326,110 B1
(45) Date of Patent: Jun. 10, 2025

(54) SYSTEMS AND METHODS OF GENERATING POWER USING A HYDROGEN FUEL SYSTEM

(71) Applicant: SAUDI ARABIAN OIL COMPANY, Dhahran (SA)

(72) Inventors: Abdullah Nasser Al-Qahtani, Dhahran (SA); Hamad Mohammed Alowaiydh, Dammam (SA); Matlaq Mahdi Al-Qahtani, Safwa (SA); Abdulaziz Mutlaq Alotaibi, Juaymah (SA); Ali Hemoud Alshehri, Dhahran (SA); Mohammed Salah Alhazzaa, Jubail (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/738,326

(22) Filed: Jun. 10, 2024

(51) Int. Cl.
| | |
|---|---|
| *F02C 6/00* | (2006.01) |
| *F02C 3/20* | (2006.01) |
| *F02C 7/22* | (2006.01) |
| *F02C 9/16* | (2006.01) |
| *F02C 9/26* | (2006.01) |
| *F02C 9/28* | (2006.01) |

(52) U.S. Cl.
CPC ............... *F02C 6/00* (2013.01); *F02C 3/20* (2013.01); *F02C 7/22* (2013.01); *F02C 9/16* (2013.01); *F02C 9/26* (2013.01); *F02C 9/263* (2013.01); *F02C 9/28* (2013.01)

(58) Field of Classification Search
None
See application file for complete search history.

(56) References Cited

U.S. PATENT DOCUMENTS

| | | | |
|---|---|---|---|
| 5,329,757 A * | 7/1994 | Faulkner | F02C 3/22 |
| | | | 60/776 |
| 7,781,112 B2 | 8/2010 | Sridhar | |
| 7,803,473 B2 | 9/2010 | Balan | |
| 2010/0154381 A1* | 6/2010 | Rapp | F02C 3/22 |
| | | | 60/39.12 |
| 2018/0287387 A1 | 10/2018 | Lansing, Jr. | |
| 2019/0264582 A1* | 8/2019 | Hinders | F01K 23/10 |
| 2022/0065162 A1* | 3/2022 | Hunt | H02J 3/381 |
| 2024/0171005 A1* | 5/2024 | Chen | C25B 1/04 |

* cited by examiner

*Primary Examiner* — Thomas P Burke
(74) *Attorney, Agent, or Firm* — Vorys, Sater, Seymour and Pease, LLP

(57) ABSTRACT

A hydrogen production and electricity generation system includes an electrolyzer that splits water into oxygen and hydrogen, a renewable power source that powers the electrolyzer, a combustion gas turbine, and a turbo-expander. An oxygen storage tank receives compressed oxygen from the combustion gas turbine, and a hydrogen storage tank receives compressed hydrogen form the turbo-expander fluid communication with the second compressor to receive and store a portion of the compressed hydrogen. The system is operable in a first mode, where the compressed oxygen and hydrogen are provided to the combustion gas turbine while the electrolyzer is powered by the renewable power source, and a second mode, where the renewable power source is unable to power the electrolyzer and the compressed oxygen and hydrogen are provided to the combustion gas turbine from the oxygen and hydrogen storage tanks, respectively.

20 Claims, 3 Drawing Sheets

SYSTEMS AND METHODS OF GENERATING POWER USING A HYDROGEN FUEL SYSTEM

FIELD OF THE DISCLOSURE

The present disclosure relates generally to hydrogen fuel systems and, more particularly, to systems and methods for generating power using a closed-loop, battery-less hydrogen fuel system.

BACKGROUND OF THE DISCLOSURE

As concerns over climate change continue to increase, there is growing interest in mitigating the effects of industrial processes, such as materials and energy production. Hydrogen fuel systems are one approach that has been suggested for mitigating the effects of carbon dioxide and other greenhouse gas emissions. Hydrogen-based industrial operations emit fewer greenhouse gases by mitigating the presence of carbon during industrial processes.

Although current techniques for hydrogen-supported energy production are based on technological advancements made over many years, current hydrogen-supported technology may still be ineffective to achieve ideal energy production results. As a result, implementation of hydrogen exploration and generation technologies may be hindered, consequently reducing greenhouse gas mitigation. There is an impetus to improve current hydrogen generation technology to improve the cost and environmental impact of energy production, including, for example, reducing the environmental impact of hydrogen-supported processes, increasing the throughput of energy production, decreasing the cost of energy production, reducing the cost and inefficiency associated with hydrogen-supported energy production, and the like.

Consequently, there exists a need for further improvements in hydrogen-supported energy production technology to overcome the aforementioned technical challenges and other challenges not mentioned.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a hydrogen production and electricity generation system is disclosed and includes an electrolyzer operable to split water into oxygen and hydrogen, the oxygen being received in an oxygen line and the hydrogen being received in a hydrogen line, a renewable power source that generates electricity to power the electrolyzer, and a combustion gas turbine that includes a first compressor that receives and compresses the oxygen in the oxygen line and thereby generates compressed oxygen, a combustor that receives and combusts the compressed oxygen and compressed hydrogen to generate a pressurized gas, and a turbine that receives and is driven by the pressurized gas. The system further includes a turbo-expander including a second compressor that receives and compresses the hydrogen in the hydrogen line and thereby generates the compressed hydrogen, an electrical generator operatively coupled to the turbine such that driving the turbine correspondingly drives the electrical generator and thereby generates electrical energy, an oxygen storage tank in fluid communication with the first compressor to receive and store a portion of the compressed oxygen, and a hydrogen storage tank in fluid communication with the second compressor to receive and store a portion of the compressed hydrogen. The system is operable in a first mode, where the compressed oxygen and hydrogen are provided to the combustor while the electrolyzer is powered by the renewable power source, and a second mode, where the renewable power source is unable to power the electrolyzer and the compressed oxygen and hydrogen are provided to the combustor from the oxygen and hydrogen storage tanks, respectively.

According to another embodiment consistent with the present disclosure, a method of hydrogen production and electricity generation is disclosed and includes the steps of generating electricity with a renewable power source, powering an electrolyzer with the electricity to split water into oxygen and hydrogen, the oxygen being received in an oxygen line and the hydrogen being received in a hydrogen line, compressing the oxygen in the oxygen line with a first compressor of a combustion gas turbine and thereby generating compressed oxygen, receiving and storing a portion of the compressed oxygen in an oxygen storage tank in fluid communication with the first compressor, compressing the hydrogen in the hydrogen line with a second compressor of a turbo-expander and thereby generating compressed hydrogen, receiving and storing a portion of the compressed hydrogen in a hydrogen storage tank in fluid communication with the second compressor, combusting the compressed oxygen and the compressed hydrogen with a combustor of the combustion gas turbine and thereby generating a pressurized gas, driving a turbine of the combustion gas turbine with the pressurized gas and thereby driving an electrical generator operatively coupled to the turbine to generate electrical energy, receiving the compressed oxygen and the compressed hydrogen from the electrolyzer at the combustor while the electrolyzer is powered by the renewable power source, and receiving the compressed oxygen and the compressed hydrogen at the combustor from the hydrogen and oxygen storage tanks, respectively, when the renewable power source is unable to power the electrolyzer.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only example embodiments and are therefore not to be considered limiting of its scope, and may admit to other equally effective embodiments.

DETAILED DESCRIPTION

Figure 1:
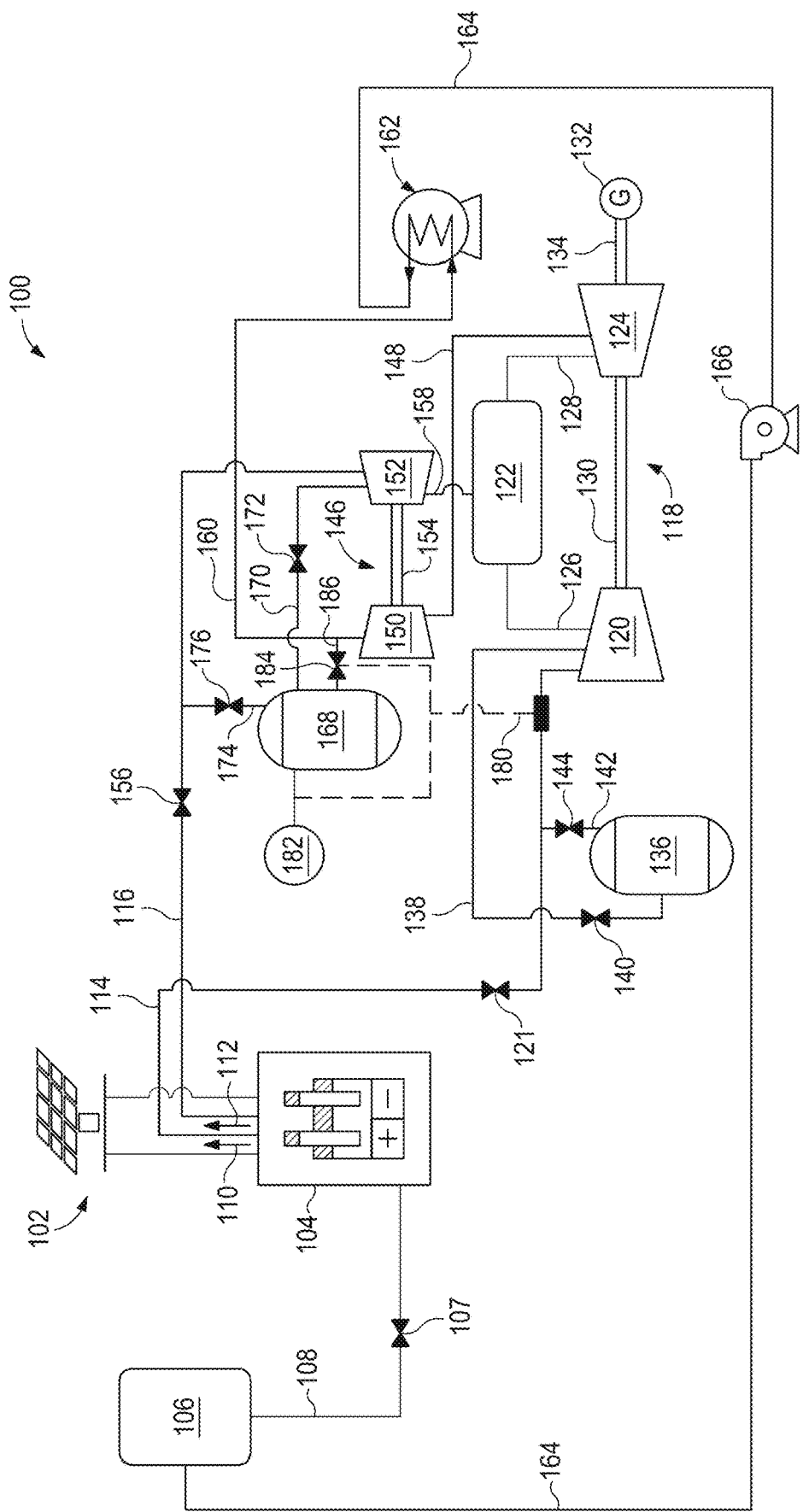
FIG. 1 depicts an example system for generating electricity using a closed-loop, battery-less hydrogen fuel system, in accordance with one or more embodiments of the present disclosure.

Embodiments of the present disclosure will now be described in detail with reference to the accompanying drawing figures. Like elements in the various figures may be denoted by like reference numerals. Further, in the following detailed description, specific details are set forth in order to provide a more thorough understanding of the claimed subject matter. However, it will be apparent to one of ordinary skill in the art that the embodiments disclosed herein may be practiced without these specific details, or with details that are not described herein in the interest of clarity. Thus, in some instances, well-known features have not been described in detail to avoid unnecessarily complicating the description. Additionally, it will be apparent to one of ordinary skill in the art that the scale of the elements presented in the accompanying drawing figures may vary without departing from the scope of the present disclosure.

Energy demands oftentimes follow cycles that depend on weather patterns of a particular region, or on the daily shift from day to night. For example, energy demands that are reliant on green energy production technologies may be predictably met during the daytime or under certain weather conditions (e.g., windy conditions), but may be unmet at night or when subject to alternative weather conditions (e.g., little or no wind). Thus, there is a desire to generate and store excess energy generated using hydrogen-assisted processes when demand is low for later use when energy demand increases. This has traditionally been done using battery systems. Conventional battery systems, however, can be prone to degradation and exhibit a gradually diminishing energy storage capacity that may inhibit continuous use (and storage) of renewable energy. Additionally, battery systems can be costly to maintain and have performance metrics that vary based on the climate.

Embodiments in accordance with the present disclosure generally relate to hydrogen fuel systems and, more particularly, to systems and methods for generating power using a closed-loop, battery-less hydrogen fuel system. The methods and systems described herein include a full-day (24-hour) redundant process that is not exclusively dependent on renewable sources of energy to generate "green hydrogen". In contrast to "grey" hydrogen, which is the production of hydrogen derived from fossil fuels without carbon capture, green hydrogen refers to hydrogen produced by the electrolysis of water and using a renewable electricity source. Producing green hydrogen results in significantly lower greenhouse gas emissions as compared to producing grey hydrogen.

As described herein, water electrolysis may be powered using a renewable source of energy for the generation of green hydrogen and oxygen, and the produced oxygen and hydrogen streams may be used (e.g., combusted) to generate electricity. A portion of the generated oxygen and hydrogen streams may also be stored for combustion when the renewable source of energy is unable to sufficiently power the electrolysis process, thus providing a closed-loop, battery-less hydrogen fuel system that generates continuous electricity. The methods and systems described herein may be capable of meeting high-demand electricity and green hydrogen generation targets while utilizing renewable energy, which may mitigate or eliminate $CO_2$ emission that would otherwise be generated during continuous energy production.

FIG. 1 illustrates an example hydrogen production and electricity generation system 100 in accordance with the principles of the present disclosure. As illustrated, the hydrogen production and electricity generation system 100 (hereafter "the system 100") includes a renewable power source 102 configured to generate electricity that is used to power and operate an electrolyzer 104. In some embodiments, the renewable power source 102 may comprise a large scale solar photovoltaic (PV) panel array that is maintained without batteries. In such embodiments, the solar panels may be aligned to target a high-factor direct sunlight exposure to boost the electricity production. In other embodiments, however, the renewable power source 102 may comprise other types of renewable energy sources including, but not limited to, one or more wind turbines, a hydroelectric power source, or any combination thereof.

As long as it is operational, the renewable power source 102 may be configured to supply electrical power or energy (e.g., a constant, direct current) to energize or power the electrolyzer 104. In embodiments where the renewable power source 102 comprises an array of solar panels, for example, a continuous supply of electrical power may be provided to the electrolyzer 104 as long as there is sufficient solar energy to operate the electrolyzer 104; e.g., during daytime. The electrolyzer 104 is supplied with water from an adjacent water supply or storage tank 106 in fluid communication with the electrolyzer via a water line 108. In some embodiments, a valve 107 may be arranged in the water line 108 to regulate the flow of water from the water storage tank 106 to the electrolyzer 104. At the electrolyzer 104, the electricity supplied to the electrolyzer 104 from the renewable power source 102 is used to split the water into a stream of oxygen ($O_2$) 110 and a stream of hydrogen ($H_2$) 112. The stream of $O_2$ 110 is received and conveyed within an $O_2$ line 114 as oxygen turbine feed, and the stream of $H_2$ 112 is conveyed and received within an $H_2$ line 116 as hydrogen turbine feed.

The system 100 may further include a combustion gas turbine 118 that includes a rotating gas compressor 120, a combustor 122, and a turbine 124. The $O_2$ line 114 may fluidly communicate with the combustion gas turbine 118 and, more particularly, with the compressor 120, referred to herein as the "first" compressor 120. In some embodiments, a first valve 121 may be arranged in the $O_2$ line 114 and configured to selectively regulate the flow of $O_2$ to the first compressor 120.

At the first compressor 120, the oxygen in the $O_2$ line 114 is compressed to a higher pressure and a resulting compressed stream of oxygen is conveyed to the combustor 122 via a gas line 126. At the combustor 122, the compressed $O_2$ is combusted (ignited) along with compressed hydrogen (discussed below) to generate a high-temperature, pressurized gas that is conveyed to the turbine 124, referred to herein as the "first" turbine 124, via a gas line 128. At the first turbine 124, the pressurized gas is received and expanded to power (drive) the first turbine 124, and driving the first turbine 124 correspondingly drives operation of the first compressor 120. As illustrated, the first turbine 124 is operatively coupled to the first compressor 120 via a compressor drive shaft 130 such that operating (rotating) the first turbine 124 correspondingly drives the compressor drive shaft 130 and operates the first compressor 120.

According to embodiments of the present disclosure, driving (operating) the first turbine 124 may also be configured to operate an electrical generator 132 to generate electricity. More specifically, the electrical generator 132 may be operatively coupled to the first turbine 124 via a generator drive shaft 134 such that operating (rotating) the first turbine 124 also drives the electrical generator 132 via the drive shaft 134. The electrical energy generated by driving (operating) the electrical generator 132 may be used for a variety of purposes including, but not limited to, providing power to a local grid.

Operation of the combustion gas turbine 118 may also be configured to provide a supply of compressed oxygen that can be stored for later use. This may prove advantageous when the renewable power source 102 is unable to generate electricity needed to operate the electrolyzer 104 to produce new oxygen 110. In particular, as illustrated, a portion of the compressed $O_2$ may be discharged from the first compressor 120 (e.g., side discharged) during operation and conveyed to an $O_2$ storage tank 136 via line 138. A second valve 140 may be arranged in the line 138 and operable to regulate the flow of compressed $O_2$ to the $O_2$ storage tank 136 from the first compressor 120. Moreover, the $O_2$ storage tank 136 may be in fluid communication with the $O_2$ line 114 via a discharge line 142, and a third valve 144 may be arranged in the discharge line 142 to regulate flow from the $O_2$ storage tank 136 to the $O_2$ line 114.

As the combustion gas turbine 118 operates, the $O_2$ storage tank 136 may be configured to receive and store a predetermined amount (e.g., volume) of compressed $O_2$ received from the first compressor 120. The size (volume) of the $O_2$ storage tank 136 can be determined based on load requirements. For example, one cubic meter of hydrogen will generate roughly 3.0 kWh at ambient condition, which requires 0.5 cubic meter of oxygen. Once the predetermined amount of compressed $O_2$ is received within the $O_2$ storage tank 136, the second valve 140 may be closed. In at least one embodiment, closing the second and third valves 140, 144 may occur automatically. In such embodiments, for example, the $O_2$ storage tank 136 may include one or more sensors operable to measure the volume of $O_2$ within the $O_2$ storage tank 136, and once the sensors detect that the predetermined amount of compressed $O_2$ is reached, a signal may be sent to close the second and third valves 140, 144. In other embodiments, a signal may be sent when the predetermined amount of compressed $O_2$ is reached and the second and third valves 140, 144 may be manually closed, without departing from the scope of the disclosure.

The compressed $O_2$ stored within the $O_2$ storage tank 136 may be used to operate the combustion gas turbine 118 when the electrolyzer 104 is not operating, such as when the renewable power source 102 is unable to produce sufficient electrical power to operate the electrolyzer 104. In such applications, the first and second valves 121, 140 may be closed, and the third valve 144 may be opened to supply the compressed $O_2$ to the combustion gas turbine 118 for combustion and electricity generation. As a result, the system 100 may be able to provide uninterrupted, and round-the-clock (24 hour) generation of electricity at the electrical generator 132.

The system 100 may further include a turbo-expander 146, and the exhaust gas from the first turbine 124 may be exploited to operate the turbo-expander 146. More specifically, the exhaust gas from the first turbine 124 may be discharged into an exhaust line 148 that fluidly couples the first turbine 124 to the turbo-expander 146. As illustrated, the turbo-expander 146 includes a turbine 150 and a compressor 152 operatively coupled to the turbine 150 with a drive shaft 154 such that operation (rotation) of the turbine 150 correspondingly operates the compressor 152.

The turbine 150, referred to herein as the "second" turbine 150, may be configured to receive the exhaust gas from the first turbine 124, and the pressure of the exhaust gas is used to operate (rotate) the second turbine 150. Operation (rotation) of the second turbine 150 may be configured to operate the compressor 152, referred to herein as the "second" compressor 152. More specifically, the second turbine 150 may be operatively coupled to the second compressor 152 via an interconnected drive shaft 154 such that operation of the second turbine 150 correspondingly operates the second compressor 152 via the drive shaft 154. The second compressor 152 is fluidly coupled to the $H_2$ line 116, and operating the second compressor 152 may draw in and compress the hydrogen flowing within the $H_2$ line 116. A fourth valve 156 may be arranged in the $H_2$ line 116 to regulate the flow of hydrogen to the second compressor 152 from the electrolyzer 104.

A portion of the compressed hydrogen may be discharged from the second compressor 152 of the turbo-expander 146 and fed to the combustor 122 via line 158. At the combustor 122, the compressed hydrogen is mixed with the compressed oxygen and combusted (ignited) to generate the high-temperature, pressurized gas that is conveyed to the first turbine 124, as generally described above.

The exhaust from the second turbine 150 may be discharged and received within an exhaust line 160 that fluidly communicates with a condenser 162. At the condenser 162, the pressure and temperature of the exhaust are reduced, which condenses the exhaust into a condensate or liquid (e.g., water). The liquid discharged from the condenser 162 may then be circulated to the water storage tank 106 via line 164 as recycled water. In some embodiments, a pump 166 may be arranged in the line 164 and operable to pump the water to the water storage tank 106.

Operation of the turbo-expander 146 may also be configured to provide a supply of compressed hydrogen that can be stored for later use. This may prove advantageous when the renewable power source 102 is unable to generate sufficient electricity required to operate the electrolyzer 104 to produce new hydrogen 112. In particular, as illustrated, a portion of the compressed $H_2$ may be discharged from the second compressor 152 (e.g., side discharged) during operation and conveyed to an $H_2$ storage tank 168 via line 170. In some embodiments, the $H_2$ storage tank 168 may be made of metal-organic framework (MOF) materials, which have been shown to be an efficient means of storing hydrogen. In at least one embodiment, the second compressor 152 may compress the hydrogen to a liquid state to be received within the $H_2$ storage tank 168. Because of the MOF materials, receiving the compressed $H_2$ at the $H_2$ storage tank 168 may be referred to as hydrogen "adsorption" at the $H_2$ storage tank 168 since the compressed $H_2$ may be adsorbed by the MOF materials. Adsorption is holding gas as a thin film over the outside surface of the MOF materials.

A fifth valve 172 may be arranged in the line 170 and operable to regulate the flow of compressed $H_2$ to the $H_2$ storage tank 168 from the second compressor 152. Moreover, the $H_2$ storage tank 168 may be in fluid communication with the $H_2$ line 116 via a discharge line 174, and a sixth valve 176 may be arranged in the discharge line 174 to regulate flow from the $H_2$ storage tank 168 to the $H_2$ line 116.

As the turbo-expander 146 operates, the $H_2$ storage tank 168 may be configured to receive and otherwise adsorb a predetermined amount (e.g., volume) of compressed $H_2$ received from the second compressor 152. Once the predetermined amount of compressed $H_2$ is received within the $H_2$ storage tank 168, the fifth valve 172 may be closed. In at least one embodiment, closing the fifth and sixth valves 172, 176 may occur automatically. In such embodiments, for example, the $H_2$ storage tank 168 may include one or more sensors operable to measure the volume of $H_2$ within the $H_2$ storage tank 168, and once the sensors detect that the predetermined amount of compressed $H_2$ is reached, a signal may be sent to close the fifth and sixth valves 172, 176. In other embodiments, a signal may be sent when the predetermined amount of compressed $H_2$ is reached and the fifth and sixth valves 172, 176 may be manually closed, without departing from the scope of the disclosure.

Along with the compressed $O_2$ stored within the $O_2$ storage tank 136, the compressed $H_2$ stored within the $H_2$ storage tank 168 may be used to operate the combustion gas turbine 118 when the electrolyzer 104 is not operating, such as when the renewable power source 102 is unable to produce sufficient electrical power to operate the electrolyzer 104. In such applications, the fourth and fifth valves 156, 172 may be closed, and the sixth valve 176 may be opened to supply the compressed $H_2$ to the turbo-expander 146 and, more particularly, to the second compressor 152. At the second compressor 152, the hydrogen may be compressed and discharged into the line 158 to be received at the combustor 122. At the combustor 122, the compressed hydrogen is mixed with the compressed oxygen and combusted (ignited) to generate the high-temperature, pressurized gas that is conveyed to the first turbine 124, as generally described above. Consequently, the system 100 may be able to provide constant generation of electricity at the electrical generator 132.

Accordingly, the system 100 may be operable in a first mode and a second mode to continuously generate electricity at the electrical generator 132. In the first mode, the renewable power source 102 provides electrical power sufficient to operate the electrolyzer 104 and generate the streams of $O_2$ and $H_2$ 110, 112 required to operate the combustion gas turbine 118, as generally described above. In embodiments where the renewable power source 102 comprises an array of solar panels, the first mode may correspond to day time when there is sufficient solar energy to operate the electrolyzer 104. Furthermore, in the first mode, compressed $O_2$ and compressed $H_2$ may be conveyed to and stored in the $O_2$ storage tank 136 and the $H_2$ storage tank 168, respectively, for future use.

In the second mode, the renewable power source 102 is unable to provide the necessary electrical power to operate the electrolyzer 104 and generate the streams of $O_2$ and $H_2$ 110, 112. In embodiments where the renewable power source 102 comprises an array of solar panels, the second mode may correspond to night time and otherwise to times when there is insufficient solar energy to operate the electrolyzer 104. In the second mode, metered amounts of compressed $O_2$ and compressed $H_2$ stored in the $O_2$ storage tank 136 and the $H_2$ storage tank 168, respectively, may be conveyed (supplied) to the combustion gas turbine 118 for combustion and electricity generation at the electrical generator 132. More specifically, in the second mode, the first and second valves 121, 140 may be closed, and the third valve 144 may be opened to supply the compressed $O_2$ to the combustion gas turbine 118. Similarly, the fourth and fifth valves 156, 172 may be closed, and the sixth valve 176 may be opened to supply the compressed $H_2$ to the second compressor 152 of the turbo-expander 146, and subsequently to the combustor 122 of the combustion gas turbine 118. At the combustor 122, the compressed $H_2$ is mixed and combusted (ignited) with the compressed $O_2$ to generate the high-temperature, pressurized gas that powers (rotates) the first turbine 124 and generates electrical power at the electrical generator 132.

At the combustor 122, the compressed streams of oxygen and hydrogen are ideally mixed (combined) at a desired or predetermined ratio to achieve a desired combustion rate, referred to herein as a "target combustion ratio". To achieve the target combustion ratio, the system 100 may further include a feedback control loop operable to control the discharge or "desorption" rate of the hydrogen from the $H_2$ storage tank 168. In the illustrated embodiment, the feedback control loop may include a control unit 178 that communicates (either wired or wirelessly) with an oxygen flow meter 180, a temperature sensor 182 (alternatively referred to as a temperature "indicator"), and a turbine exhaust temperature control valve 184.

The oxygen flow meter 180 measures the real-time flow of oxygen in the $O_2$ line 114, and communicates with the control unit 178 to report how much oxygen is being conveyed to the combustion gas turbine 118 and, more specifically, to the combustor 122. The temperature sensor 182 may be configured to measure the real-time temperature of the liquid hydrogen within the $H_2$ storage tank 168. The temperature sensor 182 forms part of a temperature control loop designed to help control the release of hydrogen into the second discharge line 174 from the hydrogen storage tank 168. As described in more detail below, heating the hydrogen storage tank 168 will result in increased hydrogen release (desorption) from the hydrogen storage tank 168.

The temperature control valve 184 is arranged in a branch line 186 that extends between the exhaust line 160 and the $H_2$ storage tank 168. In some embodiments, as illustrated, the branch line 186 may be located at or near the discharge of the second turbine 150. As discussed below, the temperature control valve 184 may be operable to control exhaust fed into the hydrogen storage tank 168 for purposes of heating the hydrogen storage tank 168.

A desorption release rate of the hydrogen stored in the $H_2$ storage tank 168 will be controlled by a flow of the exhaust discharged from the second turbine 150 and conveyed to the $H_2$ storage tank 168 through the branch line 186. The operational position (e.g., percentage open or closed) of the temperature control valve 184 will dictate the amount of exhaust able to circulate through the branch line 186, and the exhaust will directly affect the temperature of the hydrogen within the $H_2$ storage tank 168. The temperature sensor 182 may obtain real-time temperature measurements of the $H_2$ storage tank 168 and communicate the same to the control unit 178, which may be configured to communicate with and operate the temperature control valve 184 to maintain an operational position that will achieve a required temperature within the $H_2$ storage tank 168. Many engineering design factors can be taken into consideration to determine the required temperature for desorption from the hydrogen storage tank 168, such as the sizing of the system. In at least one application, the required temperature is dictated within the instrumentation scheme and instrumentation logic to correlate the release of hydrogen to temperature, and to take needed action.

Accordingly, measurements obtained by the temperature sensor 182 may cause the control unit 178 to alter (or maintain) the operational position of the temperature control valve 184 to maintain the required temperature for suitable hydrogen desorption. Moreover, the oxygen flow meter 180 may obtain real-time flow measurements of the oxygen conveyed to the combustion gas turbine 118 and, more specifically, to the combustor 122. Such oxygen flow measurements may be conveyed to the control unit 178, which may be configured to communicate with and operate the temperature control valve 184 to maintain a predetermined operational position based on the oxygen flow rate. In some embodiments, the operational position of the temperature control valve 184 will be maintained such that a ratio of 1:2 of oxygen to hydrogen, respectively, is achieved, and thereby optimize fuel efficiency.

In some embodiments, the control unit 178 may be in communication with (either wired or wirelessly) with one or more of the first, second, third, fourth, fifth, and sixth valves 121, 140, 144, 156, 172, 176. In such embodiments, the control unit 178 may be operable and otherwise configured to manipulate the operational position of the first, second, third, fourth, fifth, and sixth valves 121, 140, 144, 156, 172, 176 to transition the system 100 between the first and second modes.

Figure 2:
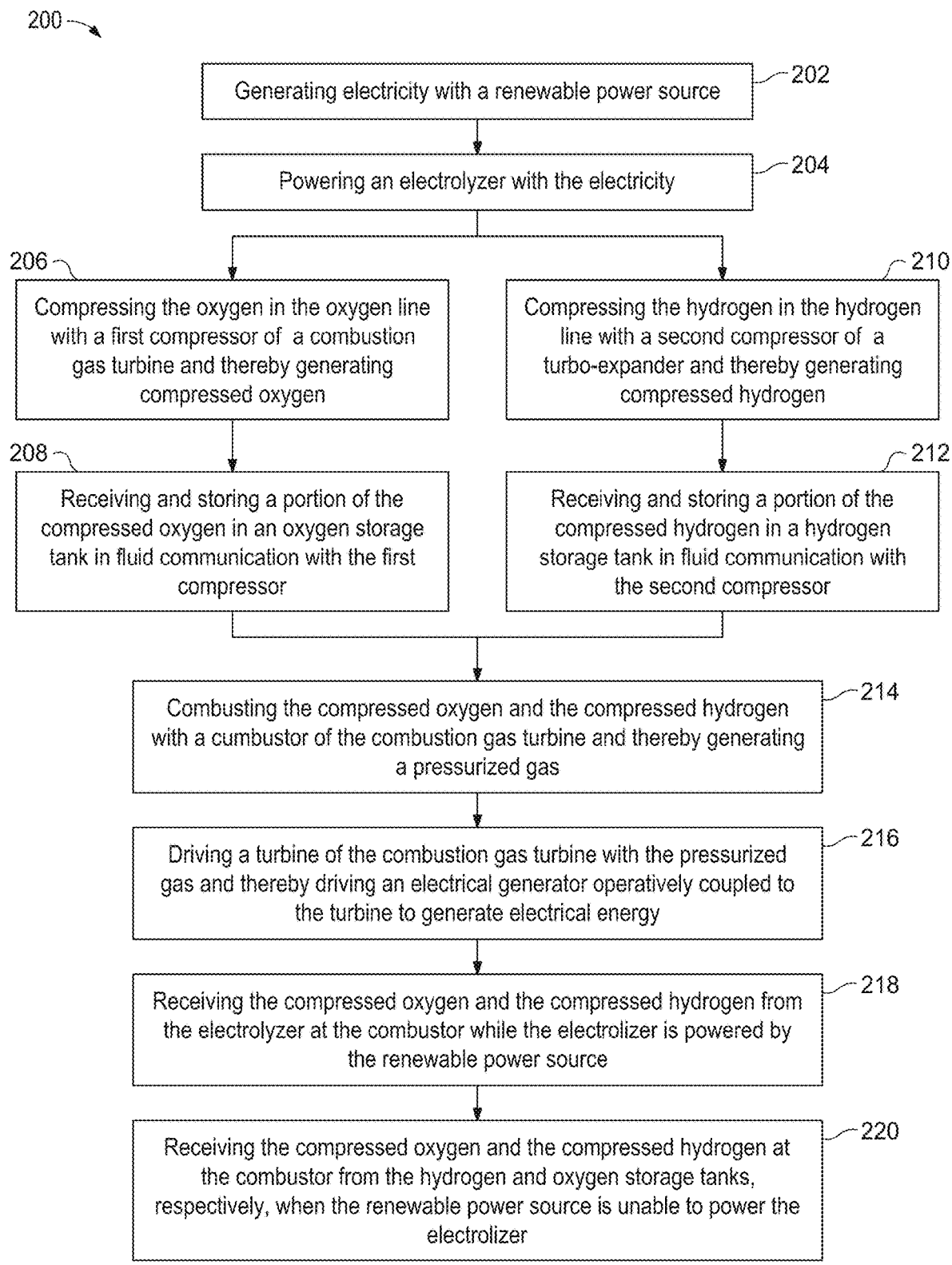
FIG. 2 is a schematic diagram of an example method of hydrogen production and electricity generation, in accordance with the principles of the present disclosure.

FIG. 2 is a schematic diagram of an example method 200 of hydrogen production and electricity generation, in accordance with the principles of the present disclosure. The method 200 may be best understood with reference to the system 100 of FIG. 1. As illustrated, the method 200 may include generating electricity with a renewable power source, as at 202, and powering an electrolyzer with the electricity, as at 204, to split water into oxygen and hydrogen. The generated oxygen will be received in an oxygen line and the generated hydrogen will be received in a hydrogen line. The method 200 may further include compressing the oxygen in the oxygen line with a first compressor of a combustion gas turbine and thereby generating compressed oxygen, as at 206, and receiving and storing a portion of the compressed oxygen in an oxygen storage tank in fluid communication with the first compressor, as at 208.

The method 200 may also include compressing the hydrogen in the hydrogen line with a second compressor of a turbo-expander and thereby generating compressed hydrogen, as at 210, and receiving and storing a portion of the compressed hydrogen in a hydrogen storage tank in fluid communication with the second compressor, as at 212. The method 200 may further include combusting the compressed oxygen and the compressed hydrogen with a combustor of the combustion gas turbine and thereby generating a pressurized gas, as at 214, and driving a turbine of the combustion gas turbine with the pressurized gas and thereby driving an electrical generator operatively coupled to the turbine to generate electrical energy, as at 216.

The method 200 may also include receiving the compressed oxygen and the compressed hydrogen from the electrolyzer at the combustor while the electrolyzer is powered by the renewable power source, as at 218, and receiving the compressed oxygen and the compressed hydrogen at the combustor from the hydrogen and oxygen storage tanks, respectively, when the renewable power source is unable to power the electrolyzer, as at 220.

In view of the foregoing structural and functional description, those skilled in the art will appreciate that portions of the embodiments may be embodied as a method, data processing system, or computer program product. Accordingly, these portions of the present embodiments may take the form of an entirely hardware embodiment, an entirely software embodiment, or an embodiment combining software and hardware, such as shown and described with respect to the computer system of FIG. 3. Furthermore, portions of the embodiments may be a computer program product on a computer-usable storage medium having computer readable program code on the medium. Any non-transitory, tangible storage media possessing structure may be utilized including, but not limited to, static and dynamic storage devices, hard disks, optical storage devices, and magnetic storage devices, but excludes any medium that is not eligible for patent protection under 35 U.S.C. § 101 (such as a propagating electrical or electromagnetic signal per se). As an example and not by way of limitation, a computer-readable storage media may include a semiconductor-based circuit or device or other IC (such, as for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, nonvolatile, or a combination of volatile and non-volatile, where appropriate.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Figure 3:
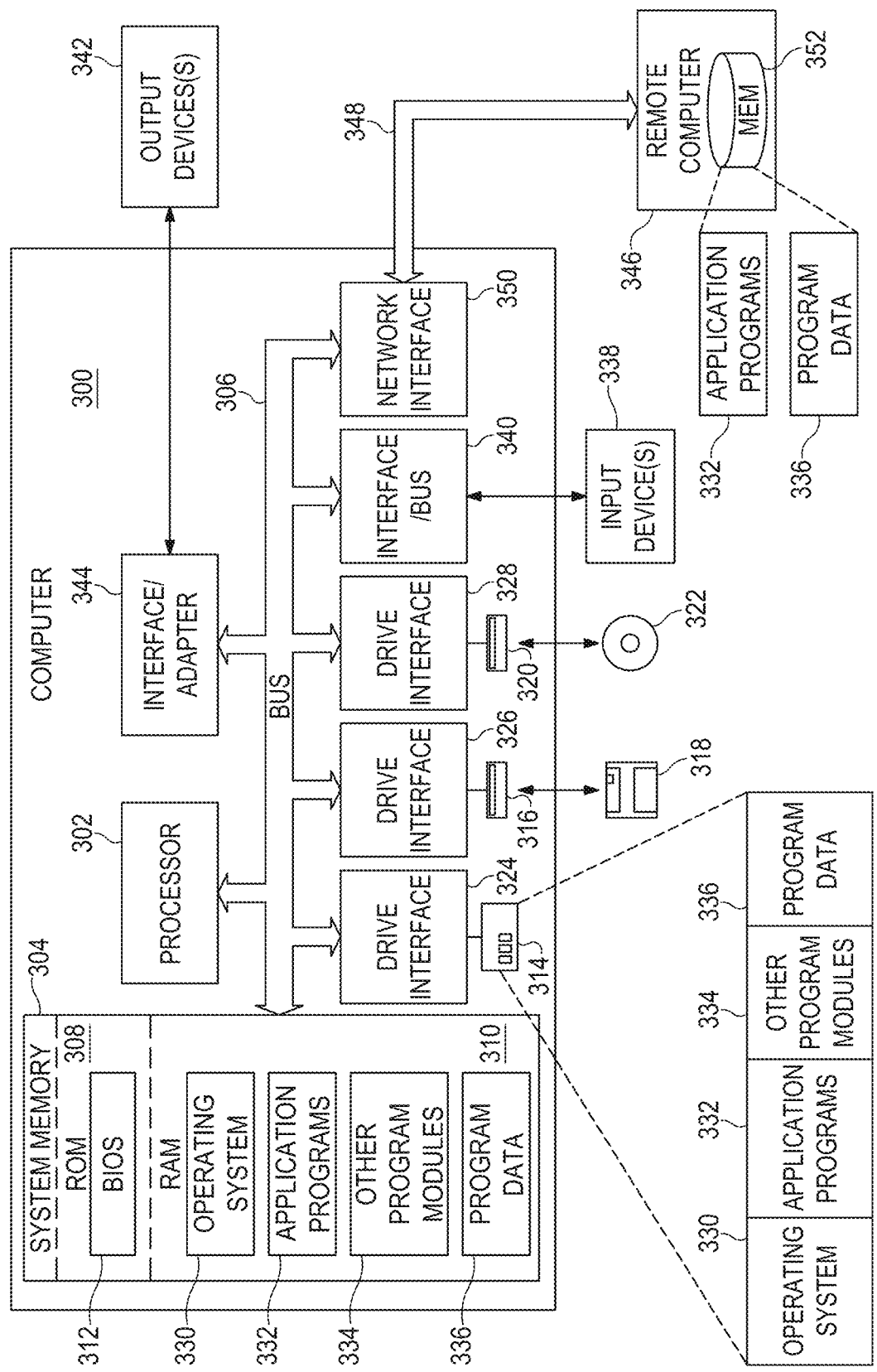
FIG. 3 is a block diagram of a computer system that may be used to implement one or more of the systems or methods described herein in accordance with certain embodiments.

In this regard. FIG. 3 illustrates one example of a computer system 300 that can be employed to execute one or more embodiments of the present disclosure. The computer system 300 may be the same as or similar to the control unit 178 of FIG. 1. The computer system 300 can be implemented on one or more general purpose networked computer systems, embedded computer systems, routers, switches, server devices, client devices, various intermediate devices/nodes or standalone computer systems. Additionally, computer system 300 can be implemented on various mobile clients such as, for example, a personal digital assistant (PDA), laptop computer, pager, and the like, provided it includes sufficient processing capabilities.

Computer system 300 includes processing unit 302, system memory 304, and system bus 306 that couples various system components, including the system memory 304, to processing unit 302. Dual microprocessors and other multiprocessor architectures also can be used as processing unit 302. System bus 306 may be any of several types of bus structure including a memory bus or memory controller, a peripheral bus, and a local bus using any of a variety of bus architectures. System memory 304 includes read only memory (ROM) 308 and random access memory (RAM) 310. A basic input/output system (BIOS) 312 can reside in ROM 308 containing the basic routines that help to transfer information among elements within computer system 300.

Computer system 300 can include a hard disk drive 314, magnetic disk drive 316, e.g., to read from or write to removable disk 318, and an optical disk drive 320, e.g., for reading CD-ROM disk 322 or to read from or write to other optical media. Hard disk drive 314, magnetic disk drive 316, and optical disk drive 320 are connected to system bus 306 by a hard disk drive interface 324, a magnetic disk drive interface 326, and an optical drive interface 328, respectively. The drives and associated computer-readable media provide nonvolatile storage of data, data structures, and computer-executable instructions for computer system 300. Although the description of computer-readable media above refers to a hard disk, a removable magnetic disk and a CD, other types of media that are readable by a computer, such as magnetic cassettes, flash memory cards, digital video disks and the like, in a variety of forms, may also be used in the operating environment; further, any such media may contain computer-executable instructions for implementing one or more parts of embodiments shown and described herein.

A number of program modules may be stored in drives and RAM 308, including operating system 330, one or more application programs 332, other program modules 334, and program data 336.

A user may enter commands and information into computer system 300 through one or more input devices 338, such as a pointing device (e.g., a mouse, touch screen), keyboard, microphone, joystick, game pad, scanner, and the like. These and other input devices 338 are often connected to processing unit 302 through a corresponding port interface 340 that is coupled to the system bus, but may be connected by other interfaces, such as a parallel port, serial port, or universal serial bus (USB). One or more output devices 342 (e.g., display, a nonitor, printer, projector, or other type of displaying device) is also connected to system bus 306 via interface 344, such as a video adapter.

Computer system 300 may operate in a networked environment using logical connections to one or more remote computers, such as remote computer 346. Remote computer 346 may be a workstation, computer system, router, peer device, or other common network node, and typically includes many or all the elements described relative to computer system 300. The logical connections, schematically indicated at 348, can include a local area network (LAN) and a wide area network (WAN). When used in a LAN networking environment, computer system 300 can be connected to the local network through a network interface or adapter 350. When used in a WAN networking environment, computer system 300 can include a modem, or can be connected to a communications server on the LAN. The modem, which may be internal or external, can be connected to system bus 306 via an appropriate port interface. In a networked environment, application programs 332 or program data 336 depicted relative to computer system 300, or portions thereof, may be stored in a remote memory storage device 352.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The term "based on" means "based at least in part on." The terms "about" and "approximately" can be used to include any numerical value that can vary without changing the basic function of that value. When used with a range, "about" and "approximately" also disclose the range defined by the absolute values of the two endpoints, e.g. "about 2 to about 4" also discloses the range "from 2 to 4." Generally, the terms "about" and "approximately" may refer to plus or minus 5-10% of the indicated number.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A hydrogen production and electricity generation system, comprising:
   an electrolyzer operable to split water into oxygen and hydrogen, the oxygen being received in an oxygen line and the hydrogen being received in a hydrogen line;
   a renewable power source that generates electricity to power the electrolyzer;

a combustion gas turbine that includes:
- a first compressor that receives and compresses the oxygen in the oxygen line and thereby generates compressed oxygen;
- a combustor that receives and combusts the compressed oxygen and a compressed hydrogen to generate a pressurized gas; and
- a first turbine that receives and is driven by the pressurized gas;

a turbo-expander including a second turbine operatively coupled to a second compressor that receives and compresses the hydrogen in the hydrogen line and thereby generates the compressed hydrogen;

a first discharge line extending from the second compressor to the combustor, wherein the combustor receives the compressed hydrogen from the first discharge line;

an electrical generator operatively coupled to the first turbine such that driving the first turbine correspondingly drives the electrical generator and thereby generates electrical energy;

an oxygen storage tank in fluid communication with the first compressor to receive and store a portion of the compressed oxygen;

a hydrogen storage tank in fluid communication with the second compressor via a second discharge line extending from the second compressor to the hydrogen storage tank, wherein the hydrogen storage tank is configured to store a portion of the compressed hydrogen received from the second compressor via the second discharge line; and a temperature control valve arranged in a branch line extending between an exhaust line of the second turbine and the hydrogen storage tank, the temperature control valve being operable to control a flow of exhaust from the second turbine into the hydrogen storage tank to regulate the real-time temperature of the hydrogen within the hydrogen storage tank, wherein the hydrogen production and electricity generation system is operable in a first mode, where the compressed oxygen and the compressed hydrogen are provided to the combustor while the electrolyzer is powered by the renewable power source, and a second mode, where the renewable power source is unable to power the electrolyzer and the compressed oxygen and the compressed hydrogen are provided to the combustor from the oxygen and hydrogen storage tanks, respectively.

2. The hydrogen production and electricity generation system of claim 1, wherein the renewable power source comprises one or more solar panels.

3. The hydrogen production and electricity generation system of claim 1, wherein the first turbine is operatively coupled to the first compressor via a compressor drive shaft such that driving the turbine correspondingly operates the first compressor to compress the oxygen in the oxygen line.

4. The hydrogen production and electricity generation system of claim 1, wherein the second turbine is operatively coupled to the second compressor by a drive shaft, and wherein exhaust from the first turbine drives the second turbine and thereby causes the second compressor to compress the hydrogen.

5. The hydrogen production and electricity generation system of claim 4, further comprising a feedback control loop including:
- an oxygen flow meter arranged in the oxygen line to measure a real-time flow rate of the oxygen in the oxygen line;
- a temperature sensor that measures a real-time temperature of the hydrogen within the hydrogen storage tank; and
- a control unit that communicates with each of the oxygen flow meter, the temperature sensor, and the temperature control valve to selectively manipulate an operational position of the temperature control valve based on measurements obtained from the oxygen flow meter and the temperature sensor, wherein the operational position of the temperature control valve controls a discharge rate of the hydrogen from the hydrogen storage tank such that a target combustion ratio between the compressed oxygen and the compressed hydrogen is achieved at the combustor.

6. The hydrogen production and electricity generation system of claim 5, wherein the hydrogen storage tank is made of metal-organic framework materials that adsorb hydrogen, and a desorption release rate of the hydrogen from the hydrogen storage tank is controlled by the flow of the exhaust from the second turbine and conveyed to the hydrogen storage tank through the branch line.

7. The hydrogen production and electricity generation system of claim 6, wherein measurements obtained by the temperature sensor are communicated to the control unit, which manipulates the operational position of the temperature control valve to maintain a required temperature for desorption of hydrogen from the hydrogen storage tank.

8. The hydrogen production and electricity generation system of claim 4, further comprising:
- a condenser in fluid communication with the second turbine to receive and condense exhaust from the second turbine, thereby generating liquid water; and
- a water storage tank in fluid communication with the condenser and the electrolyzer, wherein the liquid water is conveyed to the water storage tank from the condenser, and the water storage tank provides the liquid water to the electrolyzer to be split into the oxygen and the hydrogen.

9. The hydrogen production and electricity generation system of claim 1, wherein the oxygen storage tank is in fluid communication with the oxygen line via a third discharge line, and the hydrogen storage tank is in fluid communication with the hydrogen line via a fourth discharge line.

10. The hydrogen production and electricity generation system of claim 9, further comprising:
- a first valve arranged in the oxygen line;
- a second valve arranged in a line extending between the first compressor and the oxygen storage tank;
- a third valve arranged in the third discharge line;
- a fourth valve arranged in the hydrogen line;
- a fifth valve arranged in the second discharge line; and
- a sixth valve arranged in the fourth discharge line, wherein, when the hydrogen production and electricity generation system is in the first mode, the first, the second, the fourth, and the fifth valves are each open, and the third and the sixth valves are closed, and wherein, when the hydrogen production and electricity generation system is in the second mode, the first, the second, the fourth, and the fifth valves are each closed, and the third and the sixth valves are open.

11. The system of claim 10, wherein, when the hydrogen production and electricity generation system is in the first mode, the second valve remains open until a predetermined amount of the compressed oxygen is received within the oxygen storage tank, and the fifth valve remains open until a predetermined amount of the compressed hydrogen is received within the hydrogen storage tank.

12. A method of hydrogen production and electricity generation, comprising:
   generating electricity with a renewable power source;
   powering an electrolyzer with the electricity to split water into oxygen and hydrogen, the oxygen being received in an oxygen line and the hydrogen being received in a hydrogen line;
   compressing the oxygen in the oxygen line with a first compressor of a combustion gas turbine and thereby generating compressed oxygen;
   receiving and storing a portion of the compressed oxygen in an oxygen storage tank in fluid communication with the first compressor;
   compressing the hydrogen in the hydrogen line with a second compressor of a turbo-expander and thereby generating compressed hydrogen;
   receiving a portion of the compressed hydrogen in a hydrogen storage tank via a first discharge line extending from the second compressor to the hydrogen storage tank;
   combusting the compressed oxygen and the compressed hydrogen with a combustor of the combustion gas turbine and thereby generating a pressurized gas, the compressed hydrogen being received at the combustor from the second compressor via a second discharge line extending from the second compressor to the combustor;
   driving a first turbine of the combustion gas turbine with the pressurized gas and thereby driving an electrical generator operatively coupled to the first turbine to generate electrical energy;
   driving a second turbine of the turbo-expander operatively coupled to the second compressor;
   causing the second compressor to compress the hydrogen as the second turbine operates;
   regulating the real-time temperature of the hydrogen within the hydrogen storage tank by controlling a flow of exhaust from the second turbine into the hydrogen storage tank with a temperature control valve, the temperature control valve being arranged in a branch line extending between an exhaust line of the second turbine and the hydrogen storage tank;
   receiving the compressed oxygen and the compressed hydrogen from the electrolyzer at the combustor while the electrolyzer is powered by the renewable power source; and
   receiving the compressed oxygen and the compressed hydrogen at the combustor from the hydrogen and oxygen storage tanks, respectively, when the renewable power source is unable to power the electrolyzer.

13. The method of claim 12, wherein the first turbine is operatively coupled to the first compressor via a compressor drive shaft, the method further comprising driving the first turbine and thereby operating the first compressor to compress the oxygen in the oxygen line.

14. The method of claim 12, wherein the second turbine is operatively coupled to the second compressor with a drive shaft, the method further comprising:
   conveying exhaust from the first turbine to the second turbine;
   driving the second turbine with the exhaust from the first turbine.

15. The method of claim 12, further comprising:
   measuring a real-time flow rate of the oxygen in the oxygen line with an oxygen flow meter arranged in the oxygen line;
   measuring a real-time temperature of the hydrogen within the hydrogen storage tank with a temperature sensor; and
   selectively manipulating an operational position of the temperature control valve with a control unit in communication with each of the oxygen flow meter, the temperature sensor, and the temperature control valve, and thereby controlling a discharge rate of the hydrogen from the hydrogen storage tank such that a target combustion ratio between the compressed oxygen and the compressed hydrogen is achieved at the combustor.

16. The method of claim 15, wherein the hydrogen storage tank is made of metal-organic framework materials that adsorb hydrogen, the method further comprising controlling a desorption release rate of the hydrogen from the hydrogen storage tank by regulating the flow of the exhaust from the second turbine into the hydrogen storage tank through the branch line.

17. The method of claim 14, further comprising:
   receiving and condensing exhaust from the second turbine at a condenser in fluid communication with the second turbine, and thereby generating liquid water;
   receiving the liquid water from the condenser at a water storage tank; and
   providing the liquid water to the electrolyzer from the water storage tank to be split into the oxygen and the hydrogen.

18. A hydrogen production and electricity generation system, comprising:
   an electrolyzer operable to split water into oxygen and hydrogen, the oxygen being received in an oxygen line and the hydrogen being received in a hydrogen line;
   a renewable power source that generates electricity to power the electrolyzer;
   a combustion gas turbine that includes:
      a first compressor that receives and compresses the oxygen in the oxygen line and thereby generates compressed oxygen;
      a combustor that receives and combusts the compressed oxygen and a compressed hydrogen to generate a pressurized gas; and
      a turbine that receives and is driven by the pressurized gas;
   a turbo-expander including a second compressor that receives and compresses the hydrogen in the hydrogen line and thereby generates the compressed hydrogen;
   a first discharge line extending from the second compressor to the combustor, wherein the combustor receives the compressed hydrogen from the first discharge line;
   an electrical generator operatively coupled to the turbine such that driving the turbine correspondingly drives the electrical generator and thereby generates electrical energy;
   an oxygen storage tank in fluid communication with the first compressor to receive and store a portion of the compressed oxygen; and
   a hydrogen storage tank in fluid communication with the second compressor via a second discharge line extending from the second compressor to the hydrogen storage tank, wherein the hydrogen storage tank is configured to store a portion of the compressed hydrogen received via from the second compressor via the second discharge line, a third discharge line fluidly connecting the oxygen line to the oxygen storage tank;

a first valve arranged in a line extending between the first compressor and the oxygen storage tank; and a second valve arranged in the third discharge line, wherein the hydrogen production and electricity generation system is operable in a first mode, where the compressed oxygen and the compressed hydrogen are provided to the combustor while the electrolyzer is powered by the renewable power source, and a second mode, where the renewable power source is unable to power the electrolyzer and the compressed oxygen and the compressed hydrogen are provided to the combustor from the oxygen and hydrogen storage tanks, respectively, wherein the first valve is open and the second valve is closed when operating in the first mode, and wherein the first valve is closed and the second valve is open in the second mode.

19. The hydrogen production and electricity generation system of claim 18, further comprising:

a third valve arranged in the oxygen line;

a fourth valve arranged in the hydrogen line;

a fifth valve arranged in the second discharge line;

a fourth discharge line fluidly connecting the hydrogen storage tank and the hydrogen line; and a sixth valve arranged in the fourth discharge line, wherein, when the hydrogen production and electricity generation system is in the first mode, the third, the fourth, and the fifth valves are each open, and the sixth valve is closed, and wherein, when the hydrogen production and electricity generation system is in the second mode, the third, the fourth, and the fifth valves are each closed, and the sixth valve is open.

20. The system of claim 18, further comprising a temperature control valve arranged in a branch line extending between the hydrogen storage tank and an exhaust line of a second turbine operatively coupled to the second compressor, the temperature control valve being operable to control a flow of exhaust from the second turbine into the hydrogen storage tank to regulate the real-time temperature of the hydrogen within the hydrogen storage tank.

* * * * *